Aug. 9, 1966  E. C. WORDEN  3,265,159
CHOCK BLOCK FOR VEHICLES
Filed July 29, 1965
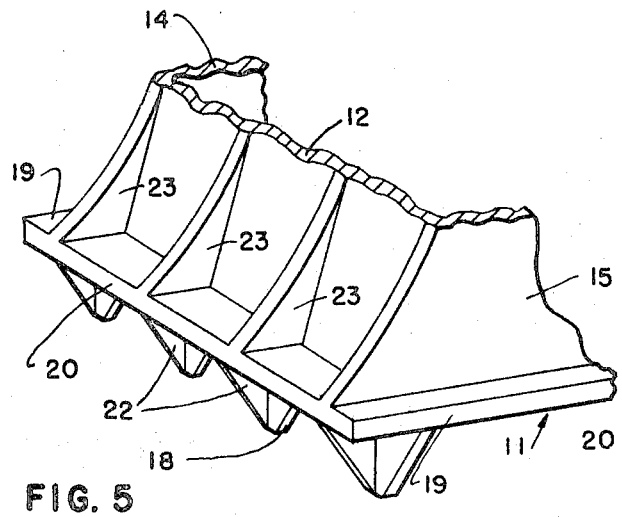
FIG. 5
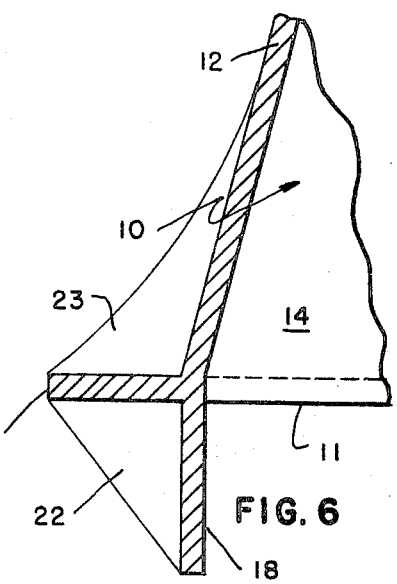
FIG. 6
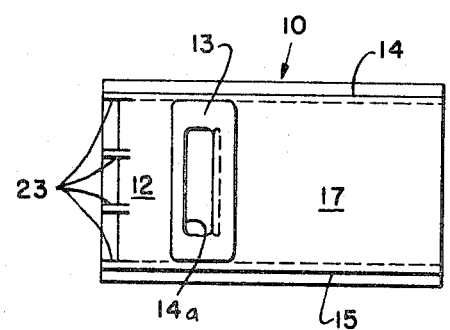
FIG. 1
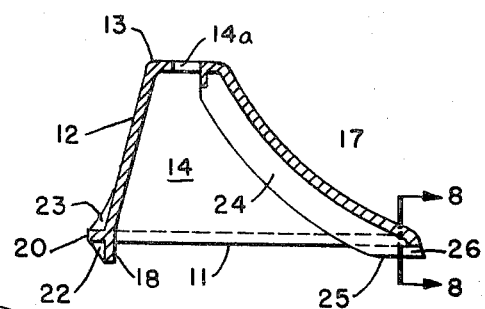
FIG. 7
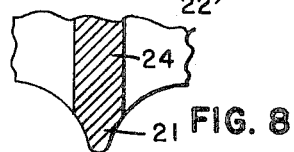
FIG. 8
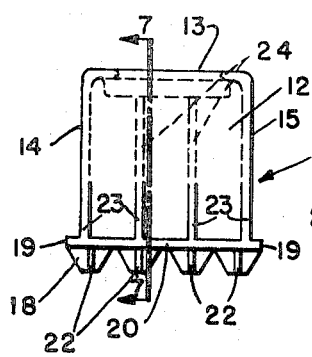
FIG. 3
FIG. 2
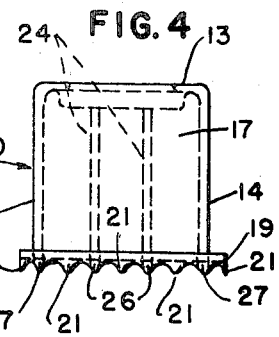
FIG. 4
INVENTOR.
EDWARD C. WORDEN
BY Max L. Farmer
Atty.

3,265,159
CHOCK BLOCK FOR VEHICLES
Edward C. Worden, P.O. Box 97, Averill Park, N.Y.
Filed July 29, 1965, Ser. No. 475,705
11 Claims. (Cl. 188—32)

This invention relates to chocks such as are used against vehicle wheels to prevent undesired rolling of a vehicle while it is parked or stopped for any reason such as, for example, while loading or unloading the vehicle or while it is standing on an incline, or while changing a tire of the vehicle.

When it is necessary to change tires on such a vehicle, it is important to place chocks before and after another wheel so that the vehicle will not shift its position while the tire is being changed. Various previous attempts have been made to provide suitable chocks, for these purposes, but they have not been entirely satisfactory. When made sufficiently strong to carry the load of a wheel pushing against the same, they were heavy and unwieldly to handle. They have also been unsafe to use because they often slid when a wheel pushed against the same.

In my prior Patent No. 2,613,764 a chock block is disclosed which has been widely accepted and used by vehicle owners and operators, but I have found that the teeth along the wedge edge, being sharp in order to grip the ground or pavement firmly, offer considerable unnecessary resistance to removal of the block when its chock action is no longer desired. It was also necessary to make the shell of such a block of quite thick and of heavy material in order to obtain the necessary rigidity and strength.

Objects of this invention are to provide a chock block for vehicles which is very easy to remove from a blocking position against a wheel. When its blocking use is to be terminated; which may be made strong and rigid enough for use with the heaviest of vehicles; which will not slip or slide when a vehicle wheel presses against it; which will effectively grip the ground or pavement when in use and a wheel presses against it, or starts to ride upon it; which is useful and effective not only on dry pavements but also those covered with ice or snow; which may be easily handled and is relatively compact and light in weight yet strong and rigid; and which is relatively simple, practical and inexpensive.

Other objects and advantages will appear from the following description of one example of the invention and the novel features will be particularly pointed out in connection with the appended claims.

In the accompanying drawing:

FIGURE 1 is a plan, on a reduced scale, of a block embodying the invention;

FIGURE 2 is a side elevation of the same;

FIGURE 3 is a rear end elevation of the same;

FIGURE 4 is a front end elevation of the same;

FIGURE 5 is a perspective of a part of the lower rear end of the same, but on a larger scale than in FIGURES 1–4;

FIGURE 6 is a longitudinal, sectioned elevation of the same, and on the same scale as in FIGURE 5, the sectional elevation being taken approximately along the line 7—7 of FIGURE 3;

FIGURE 7 is a longitudinal sectional elevation of the same, with the section taken approximately along the line 7—7 of FIGURE 3 and on the same scale as FIGURES 1–4; and FIGURE 8 is a sectional elevation of a part of the same, the section being taken approximately along the line 8—8 of FIGURE 7.

In the illustrated embodiment of the invention, the chock block is a generally wedge shaped, hollow, strong and rigid shell 10 of about the width from side to side, of a vehicle wheel periphery. This shell has an open bottom face 11. This shell has an upstanding but somewhat forwardly inclined, rear end wall 12, a flat top wall 13 with an aperture 14a serving to receive one's hand when handling the block, side walls 15 and 16, and a rearwardly and upwardly inclined, concave, arcuate blocking end surface or face 17. This concave face 17 preferably corresponds to a segment of a cylinder and makes an acute angle with the bottom face 11 and has a curvature, shape and configuration that corresponds approximately to or generally about the curvature of the periphery of a vehicle wheel against the periphery of which it is intended to be used as a vehicle chock block, so that when the block is placed on the ground or pavement against a wheel periphery, with the concave face 17 abutting the wheel periphery, the surface 17 will approach in shape or generally fit a segment of the periphery of the wheel. If the vehicle starts up, or tries to move toward this block, it will ride up upon this inclined concave face 17 and exert a downward component of pressure on that face which presses the block firmly against the ground or pavement and thus resists sliding of the block on the ground or pavement.

The rear wall 12 depends below the bottom face 11 for a substantial distance and is notched to create one set of depending teeth 18 pointed at their free ends, that are spaced apart in a row along the lower edge of wall 12. Each of the side walls 14 and 15 at its lower end edges has an exterior, horizontal flange 19 for its full lengths, and the rear wall 12 at the level of the flanges 19 has an exterior flange 20 joining and merging at its ends with the rear ends of the side flanges 19 and disposed at about the tops of the teeth 18. The lower faces of the flanges 19 and 20 define the open bottom of the shell. The front, concave wall 17 continues somewhat beyond said open face 11 and terminates in another set of depending teeth 21 spaced apart in a row across the front edge of the block. This front edge is the edge of the wedge shape of the shell and may, for convenience be called the wedge edge of the block. The lower part of the concave surface 17 generally approaches tangency with the upper faces of the side flange 19. Individual, triangular shaped fins 22 connect the rear faces of the teeth 18 with the under side of the rear wall flange 20, and individual triangularly shaped fins 23 connect the upper face of the rear flange 20 with the rear wall 12 to prevent flexing of the teeth 18. Fins 23 are spaced apart in a row across the rear wall.

To this construction, as described above, a plurality of reinforcing fins or ribs 24 are provided in the inner face of the concave front wall 17 for the full length of wall 17, and terminate at their lower ends below the open face 11 at the level of and at the points of the front teeth 21. Each of the fins or ribs 24 at its lower end, has a width about equal to the width of a tooth 21, as shown in FIGURE 8, and is aligned with and merges with such an aligned tooth at the rear face of that tooth. The lower edge 25 of each rib at its lower end, extends horizontally and rearwardly from the tooth to which it is connected or into which it merges for a distance greater than the vertical lengths of the aligned tooth 21 and preferably for a distance more than twice the vertical length of that tooth 21 into the rear face of which it merges and to which it is connected. The lower edge portions of ribs 24 below opening 11 also act as bars 26 that extend rearwardly from certain of the teeth 21 and preferably have their lower side faces all in about a common plane which is parallel to the plane of the opening 11. The side walls 14 and 15 at their forward ends depend beyond opening 11 and are aligned with and also merge into the rear faces of certain of the teeth 21, with their lower edge portions of the same size as the parts of the ribs 24 which are bars 26 and merge with teeth 21, and hence form depending strips or bars 27 that are parallel to and at the same level with the bars 26.

The shell with all its parts including ribs, teeth and flanges are preferably made integral as a one piece casting or molding of any suitable strong and rigid material with internal reinforcing members within the walls when desired, although the shell can be made of separate parts that are subsequently joined together in any suitable manner. The material may, for example, be formed of suitable castable or moldable plastics, plain or reinforced, as with fibers or screens, or of any of the various metals and alloys of metals, that give the shell the necessary strength and rigidity with as much lightness of weight as possible. The fins or ribs 24 are, for convenience in manufacture made parallel to one another, and each preferably has a width from the concave wall 17 at least equal to twice the thickness of the concave wall 17.

In use, the block is placed against a wheel periphery, with the wedge edge of the block shell abutting the wheel periphery. Since the lower part of the concave wall 17 has such a very slight inclination to the ground, if the wheel starts to roll against the block, it will tend to ride upon the wall 17 at which time the vertical resultant force from the weight of the wheel upon the wall 17 will be nearly equal to the weight on wall 17 and thus will firmly press the teeth, and the bars 25 and 26, snugly into the ground or against the pavement which resists sliding of the block along the ground or the pavement. This pressure tends to indent the teeth and the bars 25 and 26 into the ground or pavement, which hinders removal of the blocks from blocking positions when use of the blocks is no longer needed. I have found that with the fins and the bars 25 and 26 the blocks are more easily removed from blocking positions, and the fins 24 with the bars 25 and 26 increase the strength of the shell, so that I have been able to make the shell of thinner walls or lighter material and still have the necessary rigidity and strength, thus being lighter and more easily handled, more compact, and less expensive.

It will be understood that various changes in the details, materials, and arrangements of parts, which have been herein described and illustrated in order to explain the nature of the invention, may be made by those skilled in the art within the principle and scope of the invention as expressed in the appended claims.

I claim:
1. A chock block for use with wheels of vehicles to prevent undesired rolling of the vehicle, which comprises:
   (a) a generally wedge shaped, hollow, strong rigid shell of about the width of a vehicle wheel periphery, with a generally flat bottom face forming one face of a wedge, and a wall that forms the other face of such wedge, extending upwardly from said bottom wall at the wedge edge, with its upper, outer face corresponding generally in curvature and size to a segment of a cylinder that would generally fit against a peripheral segment of a selected vehicle wheel against which it is intended to be wedged in use,
   (b) the upstanding wall of said shell opposite from and generally parallel to said wedge edge terminating at its lower edge in one set of teeth spaced apart in a row along its said lower edge and depending to a substantial distance below said bottom face,
   (c) said shell also having another set of teeth arranged in a row along said wedge edge and spaced apart in such row, and depending also below said bottom face,
   (d) the wall of said shell which has the arcuate wedge face being provided on its inner surface with a plurality of reinforcing ribs from adjacent the top of the shell to and below the said bottom face of the shell and there each aligned with and merging into one of the depending teeth of said another set along said wedge edge.

2. The block according to claim 1, wherein each of said ribs as it merges into a tooth along said wedge edge terminating in the tooth with about the same size and configuration as that of that tooth.

3. The block according to claim 1, wherein each rib where it merges with a tooth along said wedge edge, having its lower surface extending in a direction away from said wedge edge for a distance greater than the extent of dependence of said teeth along said wedge edge.

4. The block according to claim 1, wherein each wall at the side of the concave face and each rib at its lower edge being aligned with and merging into a tooth along the wedge edge and terminating in the tooth with about the same cross sectional size and configuration as that of the tooth.

5. The block according to claim 1, wherein each wall at the side of the concave face and each rib at its lower edge being aligned with and merging into a tooth along the wedge edge and terminating in the tooth with about the same cross sectional size and configuration as that of the tooth and each rib at its merger with a tooth along said wedge edge having its lower surface corresponding to that of the tooth with which it merges, extending in a direction away from said wedge edge for a distance greater than the extent of dependence of said teeth along said wedge edge below said bottom face.

6. The block according to claim 1, wherein each rib at its lower edge being aligned with and merging into a tooth along the wedge edge and terminating in the tooth with about the same cross sectional size and configuration as that of the tooth.

7. The block according to claim 1, wherein each rib at its lower edge being aligned with and merging into a tooth along the wedge edge and terminating in the tooth with about the same cross sectional size and configuration as that of the tooth and each rib at its merger with a tooth along said wedge edge having its lower surface corresponding to that of the tooth with which it merges, extending in a direction away from said wedge edge for a distance greater than the extent of dependence of said teeth along said wedge edge below said bottom face.

8. The block according to claim 1, wherein said shell is open in its bottom face and has an aperture to facilitate lifting of the block in its upper face between the upper edges of said arcuate surface and the upstanding wall that is opposite from the concave surface.

9. The block according to claim 1, wherein said ribs are generally parallel to one another and to the side walls of the shell.

10. The block according to claim 1, wherein said ribs are substantially continuous downwardly from and are united to the top wall.

11. The block according to claim 1, wherein said ribs are generally parallel to one another and also merge with the top wall of the shell.

No references cited.

DUANE A. REGER, *Primary Examiner.*